United States Patent [19]

Engle

[11] 4,018,140

[45] Apr. 19, 1977

[54] HYDRAULIC DISC BRAKE ACTUATOR

[75] Inventor: Thomas H. Engle, Cape Vincent, N.Y.

[73] Assignee: General Signal Corporation, Rochester, N.Y.

[22] Filed: June 17, 1974

[21] Appl. No.: 480,439

[52] U.S. Cl. .................................. 92/31; 92/63; 92/130 A; 92/130 B; 188/170; 192/91 R

[51] Int. Cl.² .................................. F01B 3/00

[58] Field of Search ............ 188/166, 167, 196 D; 92/64, 63, 130 A, 31; 192/91 R, 91 A; 303/6 M

[56] References Cited

UNITED STATES PATENTS

| | | | |
|---|---|---|---|
| 2,904,961 | 9/1959 | Herbert | 92/63 X |
| 3,181,433 | 5/1965 | Cruse | 92/63 X |
| 3,295,423 | 1/1967 | Cox, Jr. et al. | 92/63 |
| 3,508,470 | 4/1970 | Swander, Jr. et al. | 92/63 |
| 3,599,761 | 8/1971 | Schultz et al. | 188/196 D X |
| 3,661,230 | 5/1972 | Burnett | 188/71.9 |
| 3,768,601 | 10/1973 | Bejot | 188/196 D X |
| 3,782,251 | 1/1974 | Marchand | 92/63 |
| 3,833,095 | 9/1974 | Engle | 188/106 P X |
| 3,895,695 | 7/1975 | Hunter | 188/170 |

Primary Examiner—George E. A. Halvosa
Attorney, Agent, or Firm—Pollock, Vande Sande & Priddy

[57] ABSTRACT

A hydraulic disc brake actuator is disclosed. The actuator uses a first hydraulic motor for actuating a service brake, and a spring-applied, hydraulically released motor for emergency or handbrake applications. If the braking system malfunctions or is disengaged from its source of hydraulic pressure, the spring motor may be used to apply the brake by merely venting its associated hydraulic motor. The spring brake may be released by energizing a second hydraulic motor, or by using a mechanical restraction device to compress the spring motor. The spring-applied brake may be used as a parking brake or as an emergency brake.

3 Claims, 1 Drawing Figure

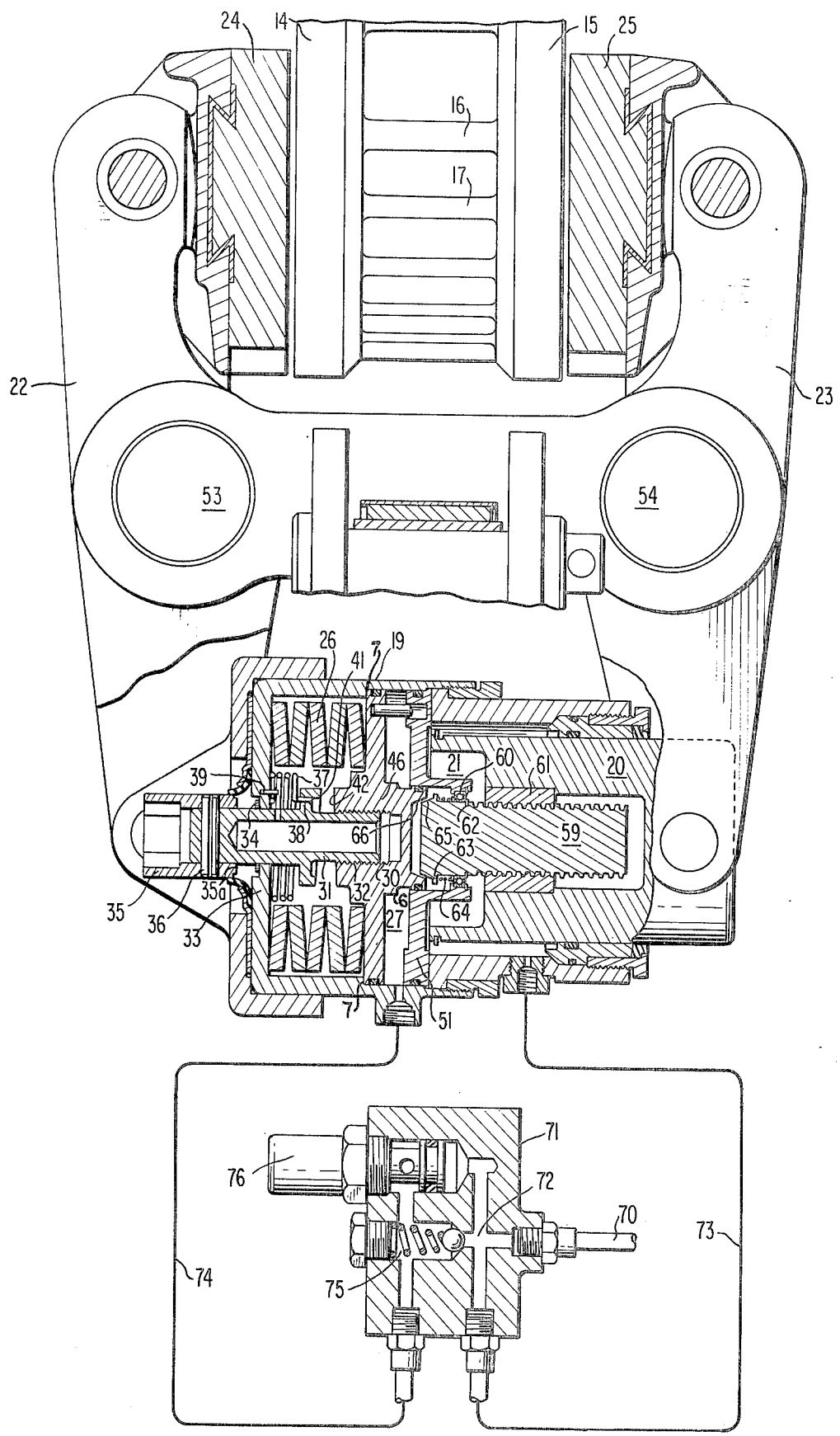

HYDRAULIC DISC BRAKE ACTUATOR

BACKGROUND OF THE INVENTION

The present invention relates to a braking system and manual retractor for use in a wide range of applications. It is especially suited for use in a combined service and handbrake control system for hydraulic disc brakes. In the preferred embodiment of the invention, the actuator has been used on a mass transit or rapid transit car.

In particular, the present invention is intended for use with a disc brake having a conventional service brake actuator and a spring applied handbrake, both of which are adapted to control braking torque through a single brake head. In addition, the present invention is applicable to braking systems which employ separate brake heads with a two-stage converter. In these converters, a fluid restrained spring motor is used to apply the parking brakes and emergency brakes by venting the fluid motor.

While spring applied parking brakes and emergency brakes have been used in the prior art as a fail-safe actuator for a friction brake system, they do present problems in releasing the brake or compressing the spring in the event of a brake system malfunction. If the system has malfunctioned, and no fluid pressure or hydraulic pressure is available to retract the brake, then a separate means must be provided for mechanically retracting the spring motor. Similarly, if the spring applied brakes are used on a vehicle without an independent fluid pressure supply source, the actuation of the spring applied brake when the car is disconnected from the train will require a separate means of retracting the brake before the vehicle can be moved.

SUMMARY OF THE INVENTION

It is therefore an object of the present invention to provide a mechanism for releasing the braking force applied by the emergency or handbrake spring actuator after a malfunction has rendered the vehicle's hydraulic or pneumatic pressure source inoperative.

It is another object of the present invention to provide an actuator for use in a novel emergency and handbrake control system that will enable the spring applied actuator to be released through the cycling of the service brake hydraulic system.

It is another object of the present invention to provide a brake actuator having a first hydraulic motor for a service brake application, and a spring applied hydraulically released motor for emergency and handbrake applications. The first hydraulic motor is equipped with a first reciprocating piston member for effecting service brake applications. The second hydraulic motor is equipped with a reciprocating piston member which is axially aligned with the first reciprocating piston. A spring motor means is employed for urging the second reciprocating piston into engagement with the first reciprocating piston member to effect an emergency and handbrake application. The second hydraulic motor is used to normally restrain the spring motor when the vehicle is in operation. Threaded means are provided for threadably engaging the second reciprocating member along its axis of reciprocation. The threaded retraction device includes means for manually rotating the device in a clockwise direction to retract the second piston and compress the spring motor. A separate torque means is also provided for automatically disengaging the retraction device after the second hydraulic motor has been pressurized. This torque means may take the form of a helically wound spring which is wound in a clockwise direction as the second piston member is retracted by the manual retraction device. The piston member is held in its retracted position by virtue of the frictional forces generated by the spring applied motor in its compressed state. When the second hydraulic motor is pressurized, and the second hydraulic piston is balanced between an equal spring force and hydraulic force, the torque means will release the threaded retraction device and restore it to its original position.

BRIEF DESCRIPTION OF THE DRAWING

The FIGURE is a diagrammatic and partially cross sectioned view of a brake actuator constructed in accordance with the teachings of the present invention.

DESCRIPTION OF THE PREFERRED EMBODIMENT

The FIGURE illustrates the brake actuator of the present invention in conjunction with a braking system for a light rail vehicle. In this configuration, the actuator drives a pair of brake shoes 24 and 25 against a mating pair of discs 14 and 15. Pressure for service actuations is supplied through service line 70 to manifold block 71. Hydraulic fluid under pressure flows from conduit 70 through junction passageway 72 to the first supply line or service line 73. The pressurization of line 73 results in the subsequent pressurization of fluid motor 21 which drives the service piston 20 to the right as illustrated in the FIGURE thereby pivoting arms 22 and 23 about pivot points 53 and 54 to effect a service brake application.

The actuator of the present invention is also equipped with a spring motor 26 which is adapted to drive piston means 46 into engagement with lead screw 59. Lead screw 59 is connected to service piston 20 by means of the threaded member 61. Spring motor means 26 is normally restrained from operation by means of a second hydraulic motor 27 which exerts a biasing force on spring means 26 to the left as illustrated in the FIGURE. Fluid motor 27 is normally pressurized, and an application of the emergency brake or handbrake is made by depressurizing chamber 27 and allowing the spring motor means 26 to drive the emergency piston 46 into engagement with lead screw 59. The emergency and handbrake motor 27 is normally pressurized through conduit 74 which is also connected to manifold block 71. Thus under normal operating circumstances, if the first hydraulic motor 21 is pressurized, a service brake application is effected. If the second hydraulic motor 27 is de-pressurized, an emergency or handbrake application is effected by spring motor means 26.

The first supply line 73 and the second supply line 74 are interconnected by means of a pressure-responsive check valve 75. When a service brake application is made, line 70 is pressurized. This also pressurizes check valve 75 and when the pressure in line 74 is lower than the pressure in line 72, pressure-responsive check valve 75 is opened, and hydraulic fluid under pressure flows to the second fluid motor 27. When the pressure is equalized between the lines 73 and 74, pressure-responsive check valve 75 closes. This prevents any transfer of hydraulic fluid back to line 73 when the service brake application is terminated. After termination, the pressure in line 73 is essentially zero, while the pressure maintained in line 74 is equivalent to the highest service brake application pressure previously applied, less any leakage from hydraulic motor 27 or the pressure-responsive check valve 75. Since some leakage is inevitable, the system relies on each succeeding service brake application to restore the pressure in the second fluid motor 27 to a level sufficient to prevent the application of spring motor means 26.

The system also includes an exhaust valve 76 for exhausting the fluid pressure maintained in conduit 74. When it is desired to make an emergency or handbrake application, the exhaust valve 76 is opened and the pressure in conduit 74 is allowed to equalize with the pressure in conduit 73. It is important to note that the pressure present in the second hydraulic motor 27 is not dumped, but is rather equalized with any pressure present in the service lines 70 and 73. If the pressure in the conduit 74 were dumped, the emergency piston force would add to the service brake force and result in a total brake force more than double that required to stop the car. This would simply lock the wheels and lengthen the stopping distance.

It is essential in establishing the emergency brake force, that the minimum and maximum service brake pressures be accurately calculated. It is necessary that the minimum service brake pressure that will be supplied under the lightest load conditions be sufficient to overcome the spring motor pressure and restrain it under all conditions. It is also necessary that the spring motor be able to exert braking force equal to that used in the service brake application applied to the most heavily laden cars. In other words, the spring motor must be capable of supplying a full service application under full load conditions, but must be restrained from application by a pressure equivalent to that applied during the lightest of load conditions. This is done by using differentially sized pistons for the hydraulic motors 21 and 27. As illustrated in the FIGURE; the effective area of piston 20 is substantially less than the effective area of piston 46. This enables the spring motor 26 to be sized so that the full service pressure equivalent to the lightest load condition, when applied to the larger surface area of piston 46 will be sufficient to compress spring motor 26 and restrain it from application. If it is assumed that the full service brake application on the lightest (empty) car will be 600 pounds per square inch, it is desirable to size the second hydraulic motor 27 to provide for a full retraction of spring motor 26 when 550 pounds of hydraulic pressure is applied to piston 46. The addition of subsequent pressure up to and including 1,000 pounds per square inch will only cause compression of piston 46 against stop 7.

If the spring motor 26 is intended to provide a force equivalent to a full load full service application, or to a hydraulic pressure of 1,000 pounds per square inch, it will be necessary to reduce the force applied to the emergency system if an emergency application is made during a service brake application. If, by virtue of the fact that the car is only partially loaded, the full service brake application pressure is 700 pounds per square inch, the addition of a force equivalent to an extra 1,000 pounds per square inch from spring motor 26 would immediately lock the brakes and cause the vehicle wheels to skid. To prevent this, exhaust valve 76 equalizes pressure between the first and second supply lines 73 and 74.

If it is assumed that an emergency application is made during a service application, valve 76 is opened with approximately the same pressure present in both the first and second supply lines 73 and 74. With equivalent pressures to both lines, spring motor 26 will be restrained from applying any additional pressure to piston 46, and to service piston 20. This will prevent any excessive amount of service brake application to brake discs 14 and 15. If however, the pressure is failing in the service brake application line 70, and an emergency brake application is made, the spring motor will be applied when the hydraulic pressure present in lines 73 and 74 drops below that normally required for a full service application on a lightly loaded car. The amount of brake application will still be tempered, but will always produce a brake force greater than that required on an empty car. If for example the pressure present in service line 73 drops to 300 pounds per square inch, the differential between 300 pounds per square inch and the retraction pressure for spring motor 26, approximately 610 psi, will, when multiplied by the piston area of the second spring motor, give the force that the spring motor will produce. As the area of the second piston is roughly twice that of the service piston, pressure deficiency below the full service pressure will be made up twice by the spring brake. Thus, in the example, the pressure deficiency of 300 psi causes a spring brake application force equivalent to approximately 600 psi to be added to the still existing 300 psi service brake thus producing braking force equivalent to a 900 psi service pressure. The additional spring brake force will be applied to piston 46 via spring motor 26. Any further drop in the pressure present in service line 70 will result in a further application of pressure from spring motor 26.

When it is desired to use a control system to actuate the handbrake, valve 76 is opened, and hydraulic fluid in fluid motor 27 is allowed to dissipate into line 70. This insures that the parking brake will remain fully applied even if the source of hydraulic pressure is de-energized, or if a pneumatic or hydraulic control means for the vehicle truck is disconnected.

Since, with the handbrake thus applied the car cannot be moved without power, a mechanical retraction device must be provided to allow release of the handbrake in the event it is desired to move the car without energizing the brake control system. Under normal circumstances the handbrake may be released by actuating the service brake and cycling it through two or three applications. An application of the service brake will supply hydraulic fluid under pressure through both lines 73 and 74 to pressurize both hydraulic motors 21 and 27. As motor 27 is pressurized, it will compress the spring motor means 26 thereby releasing the parking brake.

While the FIGURE illustrates the present invention in combination with disc brakes, and a specific type of emergency and handbrake control system, it should be noted the principles of the present invention are applicable to other types of brake systems. For example, it would be possible to apply the present invention to a system utilizing a pneumatic to hydraulic converter for the service brake. The present invention would be applicable to a wide variety of friction brakes in various configurations. However, in the preferred embodiment of the invention, the brake system employs the disc brakes and hydraulic actuators illustrated in the FIGURE. The use of hydraulic actuators and disc brakes provides the precise control that is needed for a fast response brake system used in a mass transit or rapid transit vehicle. It also provides a substantial reduction in the space required for mounting the cylinders. As illustrated in the FIGURE, each of the wheels is equipped with a segmented disc illustrated by discs 14 and 15. The brake members are mounted on the truck and define a pair of link arms 22 and 23 for each brake member. Each of the link arms carried friction pads 24 and 25 which bear against the discs 14 and 15.

The friction brake illustrated in the FIGURE is actuated by a first hydraulic motor 21. The working space of motor 21 exerts hydraulic pressure against piston member 20 and an opposing countervailing force against the rear wall 51 and housing 19. These opposing forces are transmitted to link arms 22 and 23 through pivot points 53 and 54. The opposing forces generated on either side of working space 21 are thus transmitted through the pivot points 53 and 54 into effective braking force on pads 24 and 25.

The brake actuator illustrated in the FIGURE also includes a second hydraulic motor 27, and a spring-operated motor 26. Under normal operating conditions, spring motor 26 is restrained by hydraulic fluid in working space 27. Upon a reduction in hydraulic pressure, the belleville springs 26 are allowed to exert their working pressure against piston 46 and thereby actuate the disc brake.

Although belleville springs are capable of exerting great force, they exert it only through a very short working space. Thus it is necessary to insure that the brake pads 24 and 25 are always in close contact with the discs 14 and 15. It is desirable in the design of such a brake to have a working space on the order of 10 to 15 thousandths of an inch. It is therefore necessary to provide a mechanical slack adjuster to insure that the pressure exerted by the belleville springs is transmitted directly to the brake pads rather than being lost in the slack or play present through normal wear in the mechanical linkage.

To provide this mechanical slack adjustment, a freely rotating lead screw 59 with a suitably steep pitch to its threads is journaled for rotation and reciprocation in bearing means 60. The lead screw 59 is threaded into member 61 which is fixably and rigidly secured to piston member 20. The lead screw 59 is capable of approximately (3/16) of an inch of axial travel and is limited in its axial travel by snap ring 62 and by abutment 66. A spring means 64 is also provided to insure that under normal operating circumstances the lead screw 59 is biased to its leftward position as illustrated in the FIGURE wherein the snap ring 62 engaged bearing means 60. Lead screw 59 is also equipped with a conical pressure head 65. Conical head 65 engages a similar and mating surface 66 formed on the inner periphery of piston 46.

In normal operation, working space 27 is pressurized and piston member 46 is urged to its leftward position maintaining a constant bias on belleville springs 26. When the hydraulic motor 21 is actuated, piston means 20 is displaced to the right as illustrated in the FIGURE, and this displacement will rotate lead screw 59 by means of member 61. Spring means 64 is sufficiently resilient to maintain lead screw 59 within a few thousandths of an inch of the position illustrated in the FIGURE even while it is rotating by virtue of the forces exerted on it by member 61 and piston 20. Thus when a service brake application has been made, and disc brake pads 24 and 25 have been brought into contact with discs 14 and 15, the conical head of the screw will be held within a few thousandths of an inch of this relative position. When the pressure in working space 21 is vented, and the service brakes are de-energized, the disc pads are free to retract to whatever degree the separate hydraulic slack adjuster will permit and the screw will not interfere with the piston motion in any way.

The spacing between members 65 and 66 is maintained under normal operating conditions within a few thousandths of an inch. When the hydraulic fluid in motor 27 is vented, the belleville spring motor 26 will displce piston member 46 to the right, urging it into contact with the conical head 65. Once the working surfaces of 65 and 66 have engaged one another, the lead screw 59 will be secured against any further rotation. At this point, the entire force of the belleville spring motor 26 is exerted through piston member 27, lead screw 59, member 61, and piston 20 to the link arms 22 and 23. The reactive forces are then translated around pivot points 53 and 54 to the brake pads 24 and 25.

As was pointed out previously, the system does require a hydraulic slack adjuster, and a hydraulic supply means with sufficient capacity to supply the fluid required for the service motor 21 and the leakage loss from the second hydraulic motor 27. The slack adjuster previously described with respect to lead screw 59 is a mechanical slack adjuster intended to compensate for piston motion due to pad wear. It plays no part in service brake operation and does not eliminate the need for hydraulic slack adjustment.

In the preferred embodiment of the invention, the belleville spring motor has a preferred working distance of approximately 2/10 of an inch. This working space must be carefully selected within the belleville spring design parameters since overtravel in the compression direction can destroy the spring, while overtravel in the extension direction will render the spring motor ineffective. In designing this motor, it was assumed that the fully released position for the emergency and handbrake would be achieved with 542 pounds per square inch of hydraulic working pressure. This pressure is below the normal minimum service pressure for a lightly loaded vehicle. The normal service braking application for a vehicle with an average load was assumed to be 679 pounds per square inch, and this pressurization of the belleville spring motor 26 resulted in compression of the belleville springs traveling 0.670 inch from their free position and results in compression of piston 46 against top 7 at a load of 11,500 pounds. When the hydraulic motor 27 is vented, and spring motor 26 allowed to apply its fully effective braking force, the maximum overtravel in the extension direction as limited by stop 6 is approximately 0.111 of an inch and corresponds to a load of 8,410 pounds. As was indicated previously, it is necessary to provide differentially sized working areas for the first hydraulic motor 21 and the second hydraulic motor 27. This is to insure that the second hydraulic motor 27 will be capable of fully compressing the springs of spring motor 26 even under lightly loaded conditions.

Once the emergency or handbrake is applied to the vehicle, it may be released in two ways. The service brake may be cycled to de-energize the handbrake or emergency brake. This application fills working space 27 and pressurizes the second hydraulic motor to displace piston 46 to the left as illustrated in the FIGURE against spring motor 26. Again in the preferred embodiment, it requires 3.65 cubic inches of oil to release the brakes and approximately 2.96 cubic inches of oil to provide proper pad clearance and the desired overtravel of springs 26. In the preferred embodiment of the invention, the booster capacity provides 7.2 cubic inches of oil per stroke, so one service application is sufficient to adequately pressurize the second hydraulic motor 27 and compress the belleville springs 26.

The emergency or handbrake may also be released manually, in the event it is desired to release the brake with an inoperative or disconnected service brake. A mechanical retraction device is used to compress spring motor 26. As illustrated in the FIGURE, the emergency piston 46 is equipped with internal screw threads 30. These screw threads are engaged by a retraction screw 31 which is equipped with external threads 32. The retraction screw 31 is journaled for rotation in endcap 33 and is fixedly restrained from axial travel during retraction by means of thrust washer 34. Retraction screw 31 is rotated by means of a socket drive wrench which is inserted into a socket 35. Socket 35 is fixably secured to retraction screw 31 by means of pin 36 and includes a radial flange 35A which abuts thrust washer 34 when the emergency or handbrake has been actuated, thereby preventing axial movement of retraction screw 31 relative to end cap 33 during manual retraction. To retract the emergency piston 46 and compress spring motor 26, a wrench is inserted into socket 35 and rotated in a clockwise manner. Since flange 35A turns on thrust washer 34, threads 30 and 32 will retract the emergency piston 46 to the left as illustrated in the FIGURE thereby compressing the spring motor 26.

The retraction device also includes a second helically wound spring motor 37 which is pinned to both the retraction screw 31 as illustrated at 38 and to the endcap 33 as indicated at 39. As the retraction screw and socket is rotated in a clockwise manner, spring member 37 is wound, thereby exerting a counterclockwise torque on retraction screw 31. However, the force of the belleville spring motor 26 is so great that substantial friction is generated between the threads 30 and 32 and the thrust washer. Even though spring means 37 is exerting an unwinding bias to retraction screw 31, retraction screw 31 is prevented from unwinding by virtue of the friction exerted on screw threads 32 by the spring motor 26.

Retraction screw 31 and emergency piston 46 are also equipped with abutments 41 and 42 which provide a definitive stop for any further retraction of the emergency piston 46 by lead screw 31. This prevents an overcompression of the belleville spring motor 26 or the possible jamming of threads 30 and 32.

The retraction device is disengaged by pressurizing the second hydraulic motor 27. When a service application is made, or when the service brakes are cycled, the second hydraulic motor 27 is pressurized as hereinbefore previously described. When the pressure in the second hydraulic motor 27 equalizes the bias exerted by spring motor 26, the friction between threads 30 and 32 no longer exists, and the spring means 37 is then free to rotate the retraction screw 31 in a counterclockwise manner and restore it to its original position as illustrated in the FIGURE. If desired, the manual retraction device can also be released manually by rotating socket 35 with a wrench in a counterclockwise manner to restore lead screw 31 to the position illustrated in the FIGURE.

I claim:

1. An improved brake actuator comprising:
   a fluid pressure motor having a reciprocating piston member for effecting brake applications;
   spring motor means normally restrained by said fluid pressure motor for urging said piston to effect said applications in response to a reduction in pressure in said fluid pressure motor;
   threaded means for threadably engaging said piston member along its axis of reciprocation, said threaded means establishing a frictional resistance with said piston means and including means for selectively, manually rotating said threaded means in a first direction to retract said piston member and compress said spring motor means following brake application by said spring motor or in a second direction to extend said piston member under the action of said spring motor means to effect a brake application without repressurization of said fluid pressure motor; and
   resilient torque means engaging said threaded means and being wound during rotation in said first direction to produce a torque initially insufficient to overcome said frictional resistance when said pressure released motor is depressurized but adequate for automatically rotating said threaded means in said second direction when said pressure released motor has been pressurized to compress said spring motor means and to reduce the frictional force between said piston and said threaded means sufficiently to thereby allow said threaded means to rotate under the influence of said resilient means.

2. A brake actuator as in claim 1, wherein said resilient torque means comprises a helically wound spring engaging said threaded means, which is wound in said first direction as said threaded means is rotated and unwinds in said second direction as said fluid pressure motor is pressurized.

3. A brake actuator as in claim 1, wherein said piston member defines internal threads which are engaged by said threaded means, said threads frictionally engaging said threaded means when said piston member is biased by said spring motor means.

* * * * *